United States Patent Office 3,574,192
Patented Apr. 6, 1971

3,574,192
CHLORINATION OF CAPROLACTAM
Yasuo Shibahara, Kyoto, Motoyuki Suzuki, Hirakata, Yoshihiro Hayashi, Kyoto, and Toshiro Fukuda, Otsu, Japan, assignors to Sanyo Chemical Industries, Ltd., Kyoto, Japan
No Drawing. Filed Mar. 12, 1968, Ser. No. 712,390
Claims priority, application Japan, Mar. 30, 1967, 42/20,141
Int. Cl. C07d *41/06*
U.S. Cl. 260—239.3        4 Claims

ABSTRACT OF THE DISCLOSURE

α-Chlorinated derivatives of ε-caprolactam or of N-substituted ε-caprolactam (e.g. N-benzoyl-ε-caprolactam, etc.) are prepared by chlorinating the starting compound with chlorine (gas or solution in organic solvent) in the presence of (a) phosphorus, phosphorus halide, phosphorus oxyhalide, sulfur halide, sulfur oxyhalide, phosphorus thiohalide or complexes thereof with metal halide, and (b) at least one N,N-di-substituted formamide(N,N-di-lower alkyl formamide, N-lower alkyl-N-aralkyl formamide, etc.). The products are useful as intermediates for preparing lysine.

---

The present invention relates to a novel process for producing α-position chlorine derivatives of caprolactams.

α-Chlorine derivatives of ε-caprolactam or N-substituted ε-caprolactams (hereinafter referred to as the caprolactams) are used as medicines and intermediates for producing various organic chemicals. For example, α-monochloro-ε-caprolactam and N - benzoyl - α-monochloro-ε-caprolactam are important as intermediates for producing lysine which is an essential aminocaid.

α-αDichloro-ε-caprolactam has heretofore been prepared by the reaction of ε-caprolactam with phosphorus pentachloride, and α-monochloro-ε-caprolactam has been prepared by the dechlorination of α,α-dichloro-ε-caprolactam. As to the N-substituted α-chloro-ε-caprolactams, for example, N - benzoyl-α-monochloro-ε-caprolactam, it is known to prepare the same by the reaction of N-benzoyl-ε-caprolactam with a chlorinating agent such as thionyl chloride.

These conventional methods of chlorinating the caprolactams in the α-position have some drawbacks in that a large amount of expensive chlorinating agents such as phosphorus pentachloride and thionyl chloride must be used, and that it is difficult to produce the useful α-monochloro-ε-caprolactam directly and selectively.

It is also known to prepare an α-chlorinated derivative by the chlorination of N-benzoyl-ε-caprolactam with chlorine. However, this method is poor in the yield of the desired product.

Therefore, an object of the present invention is to provide a new process of economically and easily producing α-position chlorine derivatives of the caprolactams in a high yield. Anothe robject of the present invention is to provide a process of easily producing α-monochloro derivatives as well as α,α-dichloro-ε-caprolactam.

Other objects of the present invention will be apparent from the following description.

Briefly, the process of the present invention comprises chlorinating ε-caprolactam or N-substituted ε-caprolactams with chlorine in the presence of (1) at least one inorganic compound selected from the group consisting of phosphorus, phosphorus halides, phosphorus oxyhalides, sulfur halides, sulfur oxyhalides, phosphorus thiohalides and complexes thereof with metal halides, and (2) at least one N,N-di-substituted formamide.

Preferable examples of the N-substituted caprolactams are N - benzoyl-ε-caprolactam, N - cyano-lower alkyl-ε-caprolactams (such as N-cyanoethyl-ε-caprolactam), N-lower-alkyl-ε-caprolactams (such as N-methyl-ε-caprolactam), N-hydroxy-lower alkyl-ε-caprolactams (such as N-2-hydroxyethyl-ε-caprolactam), N-lower acyl-ε-caprolactams (such as N-acetyl-ε-caprolactam) and mixtures thereof. Most preferable caprolactams are ε-caprolactam and N-benzoyl-ε-caprolactam.

Typical examples of the N,N-di-substituted formamides are N,N-di-lower alkyl formamides (such as N,N-di-methyl-, N,N - diethyl-formamides), N-lower alkyl-N-aralkyl formamides (such as N-methyl-N-benzyl formamide), and mixtures thereof. The amount of N,N-di-substituted formamides is not critical but is preferably at least 20 mol percent based on the caprolactam. In a case a large amount is used, the formamide will perform the function of a solvent. The formamide may be used together with other solvent(s) such as chloroform, dichloroethane, benzene, toluene and chlorobenzene.

Typical examples of phosphorus are red phosphorus and yellow phosphorus. Examples of phosphorus halides are phosphorus dichloride, phosphorus diiodide, phosphorus trifluoride, phosphorus trichloride, phosphorus tribromide, phosphorus triiodide, phosphorus dichlorofluoride, phosphorus pentachloride, phosphorus pentabromide, phosphorus pentaiodide and phosphorus dichlorotrifluoride. Examples of phosphorus oxyhalides are phosphorus oxyfluoride, phosphorus oxychloride, phosphorus oxybromide and phoshporus oxyiodide. Examples of phosphorus thiohalides are phosphorus thiochloride and phosphorus thiobromide. Examples of sulfur halides are sulfur monochloride, sulfur dichloride, sulfur tetrachloride, sulfur monobromide, sulfur monofluoride, sulfur difluoride, sulfur pentafluoride ($S_2F_{10}$) and sulfur hexafluoride. Examples of sulfur oxyhalides are thionyl fluoride, thionyl chloride, thionyl bromide, thionyl chlorofluoride (SOFCl), sulfuryl fluoride, sulfuryl chloride, pyrosulfuryl chloride [$(SOCl)_2O$], sulfuryl bromide and sulfuryl bromofluoride. Examples of the complexes with metal halides are aluminum chloride-thionyl chloride complex ($2AlCl_3 \cdot SOCl_2$) and aluminum chloride phosphorus pentachloride complex ($AlCl_3 \cdot PCl_5$). A mixture of two or more kinds thereof may be used. Preferable inorganic compounds among these are phosphorus, phosphorus halides, phosphorus oxyhalides and sulfur oxyhalides.

The amount of these compounds is preferably 0.5–20 mol percent based on the caprolactam. However, even if a larger amount is used, there will be no trouble in the reaction.

In the present invention, the amount of chlorine varies in a wide range (for example, 0.5–2.5 mole percent based on the caprolactam) depending on the desired product and on the particular inorganic compound (the phosphorus compounds or sulfur compounds) used. In case an α,α-dichlorinated derivative is desired, the amount of chlorine may be 2 or a little more moles (e.g. 2–2.5 moles) per mole of the caprolactam. In case an N-substituted-α-monochloroderivative is desired, equivalent or a little more moles (e.g. 1–1.5 moles) of chlorine may be used on the caprolactams. If desired, a larger amount of chlorine may be used in any of the above two cases. However, it is not economical, because an excess amount of chlorine remains unreacted. In case α-monochloro-ε-caprolactam is desired, 0.5–1.2 moles of chlorine may be used based on the ε-caprolactam. The reduction of the reaction temperature (e.g.—30 to 0° C.) is also effective to produce an α-mono-chlorinated derivative.

Chlorine is generally used in the form of gas and added gradually to the caprolactam, or may be used as a solution in an organic solvent such as dimethylformamide.

The reaction temperature is not critical, but is generally −30 to 150° C., preferably −30 to 50° C. The reaction is generally carried out under atmospheric pressure. However, it may be conducted under reduced or increased pressure.

The first advantage of the present invention is that the chlorination proceeds smoothly to produce an α-chlorinated derivative in a high yield (85–95% based on the consumed caprolactam). The second advantage is that a more useful α-monochlorinated derivative can be produced directly from the caprolactam, if so desired. In the conventional method, as mentioned above, it has been necessary to de-chlorinate an α,α-dichlorinated derivative obtained from the ε-caprolactam and a chlorinating agent. The third advantage of this invention is that the reaction temperature can be made so low that the N,N-di-substituted formamide used can be recovered without being substantially decomposed. At a high temperature, a part of the formamide will be decomposed.

The following examples will further illustrate the present invention but the invention is not limited to these examples.

EXAMPLE 1

28 g. (0.25 mole) of ε-caprolactam, 100 g. of dimethylformamide and 0.5 g. (0.016 mole) of red phosphorus were put into a 300 ml. conical flask and chlorine gas was introduced into the flask under stirring at a temperature of 10 to 15° C. When the weight increased by 18 g. (0.25 mole) the introduction of the chlorine was stopped. The stirring was continued at the same temperature for 30 minutes. Then the reaction product was poured into water and was extracted with chloroform. When the chloroform and dimethylformamide were distilled off, 36 g. of an oily substance were obtained. The composition of this oily substance was analyzed using silica gel column chromatography. The oily substance contained 24.5 g. (66% yield) of α-monochloro-ε-caprolactam, 6.5 g. (14% yield) of α,α-dichloro-ε-caprolactam and 3.0 g. (11% yield) of ε-caprolactam.

EXAMPLE 2

36 g. (0.50 mole) of chlorine gas were blown into 28 g. (0.25 mole) of ε-caprolactam, 100 g. of dimethylformamide and 0.5 g. (0.016 mole) of red phosphorus at a reaction temperature of 25 to 30° C. over 2.5 hours in the same manner as in Example 1. When the mixture was then stirred at the same temperature for 10 minutes and the reaction product was poured into water, there were obtained 39 g. of the crystal of α,α-dichloro-ε-caprolactam of a melting point of 122 to 124° C. When the mother solution of the crystal was extracted with chloroform, and the solvent distilled off, 5 g. of crystal were obtained. (Result of the analysis: a mixture of 3 g. of α,α-dichloro-ε-caprolactam and 2 g. of α-monochloro-ε-caprolactam.) The reaction product contains 42 g. (92% yield) of α,α-dichloro-ε-caprolactam and 2 g. (5% yield) of α-monochloro-ε-caprolactam.

EXAMPLE 3

27 g. (0.38 mole) of chlorine gas were added to 28 g. of ε-caprolactam, 100 g. of diethylformamide and 3 g. (0.025 mole) of thionyl chloride at a temperature of 10 to 15° C. over 2 hours in the same manner as in Example 1. The mixture was further stirred at the same temperature for 20 minutes. Then 1 liter of chloroform was added to the reaction product. When the product was well washed with water and the chloroform was distilled off, 38.5 g. of the crystal was obtained. The crystal was chromato-analyzed. The reaction product contains 25 g. (55% yield) of α,α-dichloro-ε-caprolactam and 13 g. (35% yield) of α-monochloro-ε-caprolactam.

EXAMPLE 4

12 g. (0.165 mole) of chlorine gas were added to 33 g. (0.15 mole) of N-benzoyl-ε-caprolactam, 100 g. of dimethylformamide and 2 g. (0.016 mole) of thionyl chloride at a temperature of 25 to 30° C. in the same manner as in Example 1. When the reaction product was then poured into water, 33 g. (88% yield) of the crystals of N-benzoyl-α-chloro-ε-caprolactam of a melting point of 120 to 122° C. were obtained.

EXAMPLE 5

36 g. (0.50 mole) of chlorine gas were added to 28 g. of ε-caprolactam, 10 g. of dimethylformamide, 100 g. of chloroform and 3 g. (0.02 mole) of phosphorus oxychloride at a temperature of 25 to 30° C. over 4 hours in the same manner as in Example 1. The mixture was further stirred at the same temperature for 30 minutes. When the reaction product was then washed with water and the chloroform was distilled off, 38 g. (83% yield) of α,α-dichloro-ε-caprolactam were obtained.

EXAMPLE 6

18 g. of chlorine gas were added to 28 g. of ε-caprolactam, 100 g. of dimethylformamide and 3.5 g. (0.01 mole) of aluminum phosphochloride ($AlPCl_8$) prepared on the basis of Georg, Brauer: "Handbuch der Praparative Anorganischen Chemie" at a reaction temperature of −10 to −15° C. in the same manner as in Example 1. The stirring was then continued at the same temperature for 30 minutes. When the reaction product was poured into water and was extracted with chloroform, 35.5 g. of a crystalline substance were obtained. As a result of its chromato-analysis, the crystalline substance contains 30 g. (82% yield) of α-monochloro-ε-caprolactam and 2.3 g. (5% yield) of α,α-dichloro-ε-caprolactam.

EXAMPLE 7

36 g. of chlorine gas were added to 28 g. of ε-caprolactam, 18 g. (0.25 mole) of dimethylformamide, 100 ml. of benzene and 3 g. (0.01 mole) of phosphorus tribromide at a temperature of 20–30° C. during 2 hours in the same method as in Example 1. After the mixture was then stirred at the same temperature for 30 minutes, the mixture was washed with water and benzene was distilled off. α,α-Dichloro-ε-caprolactam was obtained in a yield of 42 g. (92% of theoretical amount).

EXAMPLE 8

36 g. (0.51 mole) of chlorine gas were added to 28 g. (0.25 mole) of ε-caprolactam, 36 g. (0.50 mole) of dimethylformamide, 100 ml. of monochlorobenzene and 2 g. (0.02 mole) of sulfur dichloride at 20–30° C. during 2 hours in the same method as in Example 1. After the mixture was stirred at the same temperature for 2 hours, the mixture was washed with water and monochlorobenzene was distilled off. α,α-Dichloro-ε-caprolactam was obtained in a yield of 39 g. (85% of theoretical amount).

What we claim is:

1. A process of producing α-chlorinated derivatives of ε-caprolactam or N-benzoyl-ε-caprolactam which comprises reacting ε-caprolactam or N-benzoyl-ε-caprolactam with chlorine at a temperature between −30° C. and 50° C. in the presence of (1) at least 0.5 mole percent based on the caprolactam of at least one inorganic compound selected from the group consisting of phosphorus, phosphorous halides, phosphorous oxyhalides, sulfur halides, sulfur oxyhalides and complexes thereof with aluminum halides, and (2) at least one N,N-di-lower alkyl formamide selected from the group consisting of N,N-dimethyl formamide and N,N-diethyl formamide.

2. A process according to claim 1, in which the inorganic compound is at least one member selected from the group consisting of red phosphorus, yellow phosphorus, phosphorus chlorides, phosphorus oxychlorides, sulfur chlorides and sulfur oxychlorides.

3. A process according to claim 1, in which the molar ratio of chlorine to $\epsilon$-caprolactam or N-benzoyl-$\epsilon$-caprolactams is at least 0.5.

4. A process according to claim 1, in which the inorganic compound and the N,N-di-lower alkyl formamide are respectively used in the amount of 0.5–20 mole percent and at least 20 mole percent based on the $\epsilon$-caprolactam or N-benzoyl-$\epsilon$-caprolactam.

References Cited

UNITED STATES PATENTS

| 2,832,768 | 4/1958 | Francis et al. | 260—239.3 |
| 2,832,769 | 4/1958 | Hopkins et al. | 260—239.3 |
| 2,832,770 | 4/1958 | Hopkins et al. | 260—239.3 |
| 2,832,771 | 4/1958 | Francis et al. | 260—239.3 |
| 2,955,109 | 10/1960 | Brenner et al. | 260—239.3 |

OTHER REFERENCES

Advances in Organic Chemistry, Methods and Results, by Raphael, Tayler and Wynberg (Interscience, 1965, article by Parker), pp. 1–47.

Francis et al., J. Am. Chem. Soc., vol. 80, pp. 6238–6244 (1958).

Wineman et al., J. Am. Chem. Soc., vol. 80, pp. 6233–6237 (1958).

HENRY R. JILES, Primary Examiner

R. T. BOND, Assistant Examiner